United States Patent Office 3,561,976
Patented Feb. 9, 1971

3,561,976
METHOD OF TENDERIZING MEAT
Meyer Michael Weber, Milwaukee, Wis., assignor to Midwest Biochemical Corporation, Milwaukee, Wis., a corporation of Wisconsin
No Drawing. Filed Oct. 31, 1966, Ser. No. 590,465
Int. Cl. A22c 21/00
U.S. Cl. 99—107                                    6 Claims

ABSTRACT OF THE DISCLOSURE

A method of improving the tenderness of meat by introducing a solution of a proteolytic enzyme activator into the vascular system of a living livestock animal. The animal is slaughtered within a period of five to twenty minutes after introduction of the solution into the vascular system and the activator serves to activate the naturally occurring enzymes in the animal to break down the fibrous materials in the meat and increase the tenderness.

---

This invention relates to a method of tenderizing meat and more particularly to a method of tenderizing meat by the ante-mortem injection of proteolytic enzyme activators into the vascular system of the animal.

The tenderness of meat, and particularly beef, is a prime consideration to the consumer and thus the desire for increased tenderness has influenced livestock feeding procedures. Although improved feeding procedures can influence the tenderness of meat, the feeding procedures have not provided the desired increase in tenderness, with the result that auxiliary tenderizing processes have been utilized in an attempt to further increase the tenderness of meat.

In the past, it has been proposed to increase the tenderness of meat by maintaining the carcass under refrigeration for several weeks, during which period the tenderness is enhanced by autolysis of the meat proteins. In another common method of tenderization, the meat is held at an elevated temperature for several days and subjected to ultra-violet radiation while at the elevated temperature to prevent microorganism growth. While these processes have resulted in an improved tenderness in certain individual carcasses, these processes have not resulted in uniform tenderization of all cuts of meat and have the further disadvantage of incurring weight loss due to shrinkage and surface deterioration.

The ability of proteolytic enzymes to break down the fibrous material in meat and provide tenderization is well established. With this in mind, attempts have been made to tenderize meat by injection of proteolytic enzymes post-mortem into the animal carcass. While the addition of proteolytic enzymes to the carcass does aid in increasing the tenderization of meat, the primary problem in such a process is effecting a uniform distribution of the proteolytic enzyme throughout the carcass. Processes of this type normally utilize a pumping apparatus for distributing the enzyme through the vascular system of the carcass after bleeding. Even though a pumping system is employed, the primary cause of nonuniform tenderization lies in the failure to penetrate the finer capillaries and arterioles with the enzyme solution.

A more recent attempt at tenderization of meat is disclosed in Pat. 2,903,362 in which a proteolytic enzyme solution is injected ante-mortem into the vascular system of the animal. This ante-mortem injection has the advantage that the proteolytic enzyme will be uniformly distributed throughout the vascular system of the animal before slaughtering and therefore aids in producing more uniform tenderness of the meat. While the ante-mortem injection of proteolytic enzymes into the animal does aid in increasing the tenderness of the meat, the process is relatively expensive due to the high cost of the enzymes involved.

Instead of injecting proteolytic enzymes into the animal, the present invention takes a different approach than the prior art and is directed to the proposal of injecting ante-mortem into the vascular system of the animal certain substances capable of activating the natural occurring proteolytic enzymes. The activators function to increase the activity of the natural proteolytic enzymes so that the enzymes break down the fibrous material at a faster rate and thereby tenderize the meat. The activator solution is preferably injected into the animal about 15 to 30 minutes before slaughter, and it has been unexpectedly discovered that the activator, in this relatively short period of time before slaughter, is capable of activating the proteolytic enzymes to a degree necessary to provide a marked increase in tenderness of the meat.

While the invention has particular application to improving the tenderness of beef, it can also be used to increase the tenderness of veal, lamb, pork, as well as poultry such as chickens, geese and ducks.

The proteolytic enzyme activator is preferably water soluble and is injected as a dilute aqueous solution into the vascular system of the meat bearing animals prior to slaughter. In larger animals such as cattle, sheep and hogs, injection is made into the jugular vein, although in some cases the injection can be made directly into the heart or arteries. On smaller animals such as chickens, injection is made by means of a needle or hypodermic syringe into one of the exposed veins such as the humeral or directly into the internal metatarsal vein.

The concentration of the activator in the injection solution is not critical and can vary from very dilute solutions to relatively concentrated solutions. The amount of activator to be used is at least in part determined by the weight of the animal and particular activator employed. The amount of the activator injected into the vascular system of the animal is generally in the range of about 5 to 100 grams per 1,000 pounds of live animal, with an amount of 10 to 20 grams per 1,000 pounds of live animal being particularly satisfactory. If the amount of the activator is less than 5 grams per 1,000 pounds of live animal, the resulting improvement in the degree of tenderness is not particularly apparent, while if the amount of the activator is over 100 grams per 1,000 pounds, no further increased improvement in the degree of tenderness has been noted.

The activator to be injected into the animal can be any material capable of activating proteolytic enzymes. Proteolytic enzymes are those which hydrolyze proteins and include pancreatin, ficin, papain, bromelin, fungal and bacterial proteases and cathepsin. The activators are generally classified as reducing compounds and may take the form of sodium hydrosulfide, sodium hydrosulfite, sodium sulfide, sodium sulfite, sodium bisulfite, sodium thiosulfate, glutathione, cysteine, cysteinehydrochloride, methionine, thioacetic acid, thiolactic acid, thiobenzoic acid, thiomalic acid, sodium thioglycoate, thioglycerol, benzyl mercaptan, N-butyl mercaptan, 2-diethylaminoethanethiol, ethylthioglycolate, 3-mercaptopropionic acid, methoxyethyl thioglycolate, O-mercaptobenzoic acid, dithioerythritol, glycol dimercaptoacetate, pentaerythritol tetra (3-mercaptopropinate), pentaerythritol tetra thioglycolate, glycol dimercaptopropionate, and mixtures thereof. In addition, other alkali metals, such as potassium or lithium, can be substituted for sodium in the compounds listed above. Ammonium sulfate which activates panceratin can also be utilized as the activator. It is believed that the activators function to open up SH groups in the enzyme molecule.

The activator solution is injected into the animal ante-mortem about 5 to 120 minutes beore slaughtering and generally within 15 to 30 minutes before slaughtering. During this period after injection and before slaughter the activater is uniformly distributed throughout the vascular system of the animal and is capable of activating the naturally occurring proteolytic enzymes.

After the animal is slaughtered, the blood is drained by conventional procedures, and the draining of the blood prevents an excessive concentration of the activator in the larger blood vessels. The smaller blood vessels consisting of the venules, arterioles and capillaries are drained only slightly in the bleeding step and thus contain blood which includes the enzyme activators.

It has been found that the most significant improvement in tenderization of the meat is achieved if the meat is refrigerated for a period of 4 to 7 days after slaughtering and before freezing. This aging period aids in improving the tenderizing effect by providing additional time for the activator to activate the proteolytic enzymes which in turn act to break down the fibrous materials and increase the tenderness of the meat when cooked.

The present invention provides a simple and effective method of substantially increasing the tenderness of the meat by the ante-mortem injection of proteolytic enzyme activators into the vascular system of the animal. It has been found that even though the animal is slaughtered a short period of time after the injection, the activators will nevertheless activate the proteloytic enzymes to a sufficient degree to provide a substantial improvement in the tenderness of the meat when cooked. The method of the invention has a substantial advantage over prior art processes in that relatively inexpensive compounds can be injected into the animal with the result that the overall cost of the tenderizing procedure is substantially reduced.

The following examples illustrate applications of the invention and are not to be construed as limiting the invention to any specific application:

EXAMPLE I

Ante-mortem injections of an aqueous solution of proteolytic enzyme activators where made with a series of cattle. In each case the injection was made into the jugular vein of the animal with a 100 ml. syringe containing the activators listed in the following table. The table also lists the weight, age and sex of the cattle, the amount of the activator employed, and the time period after injection and before slaughter.

TABLE I

| Animal: | Weight, pounds | Age, years | Sex | Activator | Amount of activator (grams) | Time held before slaughter (minutes) |
|---|---|---|---|---|---|---|
| 1 | 590 | 1 | Steer | Cysteine HCl | 20 | 5 |
| 2 | 850 | 2 | Female | do | 20 | 5 |
| 3 | 740 | 3-4 | do | Cysteine HCl neutralized with $Na_3(PO_4)_2$ | 20 | 10 |
| 4 | 715 | 5 | do | do | 20 | 10 |
| 5 | 895 | 2 | do | Cysteine, free base | 15 | 10 |
| 6 | 685 | 1 | Male | Cysteine HCl | 20 | 10 |
| 7 | 810 | 1 | do | do | 45 | 5 |

Meats from the above treated cattle were subsequently roasted for tenderness panel tests and the results of the tenderness tests were as follows:

TABLE II

| Animal | Taste panel tenderness results |
|---|---|
| 1 | Good. |
| 2 | Do. |
| 3 | Do. |
| 4 | Do. |
| 5 | Do. |
| 6 | Do. |
| 7 | Very good. |

The results of the above tests indicate that the injection of proteolytic enzyme activators ante-mortem into the vascular system of the animal substantially improves the tenderness characteristics of the meat.

Various modes of carrying out the invention are contemplated as being within the scope of the following claims particularly pointing out and distinctly claiming the subject matter which is regarded as the invention.

I claim:

1. A method of improving the tenderness of meat, comprising the steps of introducing a liquid containing a proteolytic enzyme activator selected from the group consisting of an alkali metal hydrosulfide, an alkali metal hydrosulfite, an alkali metal sulfide, an alkali metal sulfite, an alkali metal bisulfite, an alkali metal thiosulfate, ammonium sulfate, glutathione, cysteine, cysteine-hydrochloride, methionine, thioacetic acid, thiolactic acid, thiobenzoic acid, thiomalic acid, an alkali metal thioglycolate, thioglycerol, benzyl mercaptan, n-butyl mercaptan, 2-diethylaminoethanethiol, ethylthioglycolate, 3-mercaptopropionic acid, methoxyethyl thioglycolate, O-mercaptobenzoic acid, dithioerythritol, glycol dimercaptoacetate, pentaerythritol tetra (3-mercaptopropenate), pentaerythritol tetra thioglycolate, glycol dimercaptopropionate, and mixtures thereof into the vascular system of a living livestock animal, and slaughtering said animal within 5 to 120 minutes after completion of the introduction of said activator into said vascular system, said activator activating the naturally occurring enzymes in said animal to break down the fibrous materials in the meat.

2. The method of claim 1, in which the activator is employed in an amount of 5 to 100 grams per 1,000 pounds of living animal.

3. The process of claim 1, in which the animal is stored under refrigeration after slaughtering for a period of 4 to 7 days before freezing.

4. The method of claim 1, in which said liquid is a dilute aqueous solution.

5. The method of claim 1, in which the alkali metal is sodium.

6. A method of improving the tenderness of meat, comprising the steps of injecting a dilute aqueous solution of a water soluble proteolytic enzyme activator selected from the group consisting of an alkali metal hydrosulfide, an alkali metal hydrosulfite, an alkali metal sulfide, an alkali metal sulfite, an alkali metal bisulfite, an alkali metal thiosulfate, ammonium sulfate, glutathione, cysteine, cysteine-hydrochloride, methionine, thioacetic acid, thiolactic acid, thiobenzoic acid, thiomalic acid, an alkali metal thioglycolate, thioglycerol, benzyl mercaptan, n-butyl mercaptan, 2-diethylaminoethanethiol, ethylthioglycolate, 3-mercaptopropionic acid, methoxyethyl thioglycolate, O-mercaptobenzoic acid, dithioerythritol, glycol dimercaptoacetate, pentaerythritol tetra (3-mercaptopropenate), pentaerythritol tetra thioglycolate, glycol dimercaptopropionate, and mixtures thereof into the vascular system of a living livestock animal in an amount of 5 to 100 grams of activator per 1,000 pounds of living animal, slaughtering said animal within 5 to 120 minutes after completion of said injection, and storing the animal under refrigeration for a period of 4 to 7 days after slaughter, said activator activating the naturally occurring enzymes in said animal to break down the fibrous materials in the meat.

References Cited

UNITED STATES PATENTS

| | | | |
|---|---|---|---|
| 2,903,362 | 9/1959 | Beuk et al. | 99—107 |
| 2,999,020 | 9/1961 | Williams | 99—107 |
| 3,019,171 | 1/1962 | Bloch et al. | 99—107X |
| 3,006,768 | 10/1961 | Williams | 99—107 |

FOREIGN PATENTS 141,755  6/1951  Australia _____ 99—107

OTHER REFERENCES

Sumner et al., "Chemistry and Methods of Enzymes," 1953, published by Academic Press, Inc., New York, N.Y., p. 451 article entitled Enzyme Activators. Copy in group 172, U.S. Pat. Off.

HYMAN LORD, Primary Examiner